Feb. 7, 1950     D. D. AUSTIN, SR     2,497,023

METHOD FOR FINISHING ELECTRIC ROTORS

Filed Oct. 14, 1946     2 Sheets-Sheet 1

*INVENTOR.*
DONALD D. AUSTIN SR.

BY Whittemore, Hulbert
& Belknap    ATTORNEYS

Feb. 7, 1950            D. D. AUSTIN, SR            2,497,023

METHOD FOR FINISHING ELECTRIC ROTORS

Filed Oct. 14, 1946            2 Sheets-Sheet 2

INVENTOR.
DONALD D. AUSTIN SR.
BY Whittemore, Hulbert
& Belknap ATTORNEYS

Patented Feb. 7, 1950

2,497,023

UNITED STATES PATENT OFFICE 2,497,023

METHOD FOR FINISHING ELECTRIC ROTORS

Donald D. Austin, Sr., Detroit, Mich., assignor to National Broach & Machine Company, Detroit, Mich., a corporation of Michigan Application October 14, 1946, Serial No. 703,161

2 Claims. (Cl. 90—11)

The present invention relates to a method of finishing the surfaces of laminated electric rotors.

Rotors of this type are built up of laminations of ferrous material appropriately cored and provided with peripheral openings for the passage therethrough of windings. In the finished rotor the laminations are firmly pressed together, but at the same time it is highly desirable that there be a distinct separation between the peripheral edges of adjacent laminations. Thus, any finishing operation performed on the outer cylindrical surface of the rotor which tends to draw metal of one lamination over into contact with the adjacent lamination is highly undesirable. Such a condition leads to the establishment of surface eddy currents with a corresponding undesirable heating effect and loss of efficiency.

A certain amount of surface roughness, which is to be distinguished from dimensional inaccuracies, is desirable since it provides what may be termed air friction, with a resulting air flow and turbulence within the stator with resultant cooling.

In the past, laminated armatures of the type referred to have been finished by a turning operation or by grinding. Both of these methods of finishing the exterior surface of the rotor are subject to the objection that they are time consuming, and further, both of these operations have a tendency to destroy the minute separation which is so desirable between adjacent laminations.

In accordance with the present invention, the exterior surface of the rotor is finished by a metal cutting operation which is termed "surface shaving." This operation is carried out by rotating the rotor in contact with a rotary toothed cutting tool of circular cross section, preferably with the axes of the rotor and cutter crossed at a limited angle in space.

It is characteristic of the contact between a cylindrical work piece such as the rotor referred to and a cutting tool of circular cross section that a contact between the rotor and cutter is limited to a relatively small zone, which results in the cutting operation being performed with a relatively light pressure. This is important in the finishing of rotors for the reason that the parts are not particularly strong and the heavy pressures which might otherwise be required would be undesirable.

In the operation the cutter is rotated at relatively high speed, as for example between 400 and 600 feet a minute, while the work piece is rotated at a very much slower speed, as for example between 20 and 60 feet a minute. As a convenient rule of thumb, satisfactory results are obtained when the total relative surface speed is in the neighborhood of 500 feet a minute. When employing a conventional cut, as is preferred, this means that the sum of the surface speeds of the work piece and of the cutter shall be in the neighborhood of 500 feet a minute. The rate of rotation of the tool and cutter are correlated such that the peripheral advance of the rotor is between .020 and .030 inch per tooth of tool rotation.

Preferably the cutter is provided with teeth which are inclined to the axis thereof. Thus for example, when the cutter is cylindrical, as is preferred, it is provided with helical teeth. In the case of a conical cutter, the teeth extend at a spiral angle with respect thereto. The cutter is set around so that its engaged teeth make a greater angle with the axis of the rotor than does its own axis.

In order to distribute the finishing action of the cutter completely over the surface of the work piece, a relative traverse between the cutter and work piece is required. This traverse may be in a direction parallel to the axis of the work piece, in which case the finishing action thereon is performed by a relatively narrow annular zone extending around the cutter. On the other hand, the direction of relative traverse may be at an angle to the axis of the work piece and this angle may be selected such that the entire surface of the cutter comes into play during the finishing operation of the entire surface of the work piece.

The relative traverse referred to above is selected such that there is a work advance relative to the cutting zone of between .100 and .500 inch per revolution of the rotor. This is a relatively rapid feed and lends itself to high output production since the cutting time for an ordinary rotor is in the neighborhood of 10–15 seconds.

By way of specific example, a rotor having a diameter of 3½ inches and a length of 3 inches may be finished by a cylindrical cutter having a diameter of 6.5 inches and having 90 teeth provided thereon which extend at a helix angle of 25°, left hand. In accordance with the teachings outlined above, the work piece is rotated at a surface speed of 50 feet per minute, which results in a rotational speed of about 54 R. P. M. In like manner, the cutter is rotated at a surface speed of 450 feet per minute, which results in a rotation speed of about 265 R. P. M. The direction of traverse makes an angle of about 43° with the cutter axis, and 13° with the work axis. The relative traverse between the cutter and work piece which is selected to give a work advance of .250 inch advance per revolution of the rotor is about 10 inches per minute. Actual traverse distance during cutting need only be about 2.2 inches due to the direction of traverse.

From the foregoing, it will be observed that the cutting action which is distributed around the work piece in a spiral path establishes a spiral having a lead of .250 inch, and the complete operation, assuming the work piece to be 3 inches long, will be completed in about 13 seconds, the finishing action of the cutter having at this time formed a pattern of 12 turns about the work piece which extend helically thereon.

The nature of the cut performed by the operation thus described is a relatively rapid cut carried out with light pressure, and it has been found that this cut leaves the surface of the work piece in very desirable condition. In the first place, the surface of the rotor has not been finished to a great degree of smoothness but instead is left relatively rough so that the desirable air turbulence within the stator may be created. More important, the cut carried by the method just outlined cuts the metal cleanly from the edge of each lamination, with the result that there is a minimum of closure of the minute gap between adjacent laminations.

It is an object of the present invention to provide a method of finishing the peripheral surfaces of laminated rotors in a manner to preserve minute separation between adjacent laminae.

It is a further object of the present invention to provide a method for finishing the surfaces of laminated rotors characterized by the briefness of the time required.

It is a further object of the present invention to provide a method for finishing the surfaces of laminated rotors characterized by greatly increased tool life.

Other objects and features of the invention will become apparent as the description proceeds, especially when taken in conjunction with the accompanying drawings, wherein.

Figure 1:
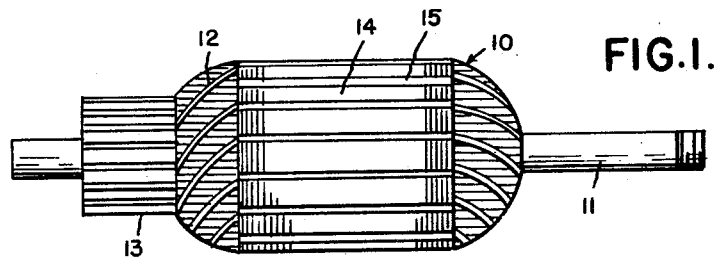
Figure 1 is a side elevation of an electric rotor of the type finished in accordance with the present invention.

Referring now to the drawings, there is illustrated in Figure 1 a rotor 10 having a supporting shaft 11, windings 12, a commutator 13, and a central core made up of a plurality of individual laminations indicated at 14. The laminations are provided with peripheral openings which are aligned in the assembled device to provide slots 15 extending substantially parallel to the axis and which are provided to receive elements of the winding 12. Conveniently, the slots 15 are filled with an insulating material, although this need not be done.

The method which forms the subject matter of the present invention is a finishing operation of the surface formed by the edges of the laminations 14, and this surface will be considered a cylindrical surface in the description which follows.

Figure 2:
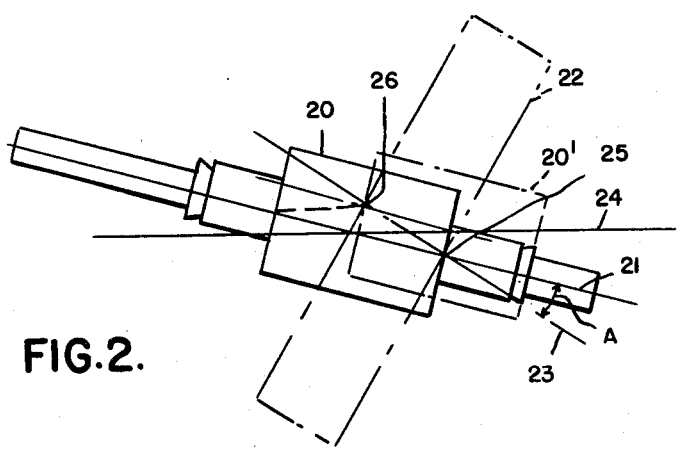
Figure 2 is a diagrammatic view showing the relationship between the rotor and the cutting tool.

Referring now to Figure 2, the rotor is shown in full lines in one limiting position as indicated at 20 and is shown in broken lines in the other limiting position as indicated at 20'. The axis of the rotor is indicated at 21. The cutter 22 is shown in position contacting the work with its axis 23 crossing the axis of the work piece by an angle A. In Figure 2 the direction of relative traverse between the rotor and the cutter is indicated by the line 24. It will be observed that in the limiting position 20 the axis of the cutter crosses the axis of the work piece at a point 25, and accordingly if the parts were rotated in the relative position indicated, only a zone adjacent the right-hand end of the rotor, as seen in Figure 2, would be finished. When, however, relative traverse in the direction of the line 24 is introduced the work piece eventually assumes the position indicated at 20' relative to the cutter, at which time the axes of the work piece and cutter cross at the point 26, which it will be observed is at the opposite side of the rotor from the point 24. Accordingly, during the relative traverse between the rotor and cutting thus described, the finishing action of the cutter has been distributed uniformly from end to end of the work piece.

It will be appreciated that if instead of providing a relative traverse in the direction of the line 24, the traverse were provided in a direction parallel to the work axis, there would be a distribution of the finishing effect of the cutter from end to end of the work piece, but the finishing action would all be performed by a narrow zone on the cutter adjacent the center of crossed axes. In order to provide for longer tool life, it is preferable to provide the relative traverse in the direction of the line 24 in Figure 2, although the finishing effect on the work piece is equivalent in either case. Since the laminations are usually high silicon steel, the use of traverse diagonal to the rotor axis is particularly valuable as increasing tool life.

Figure 4:
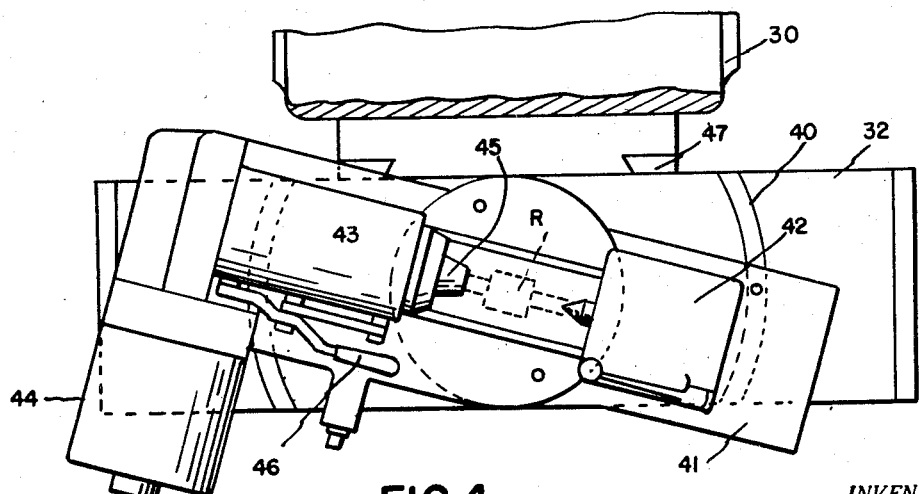
Figure 4 is a fragmentary section on the line 4—4 of Figure 3.
Figure 3:
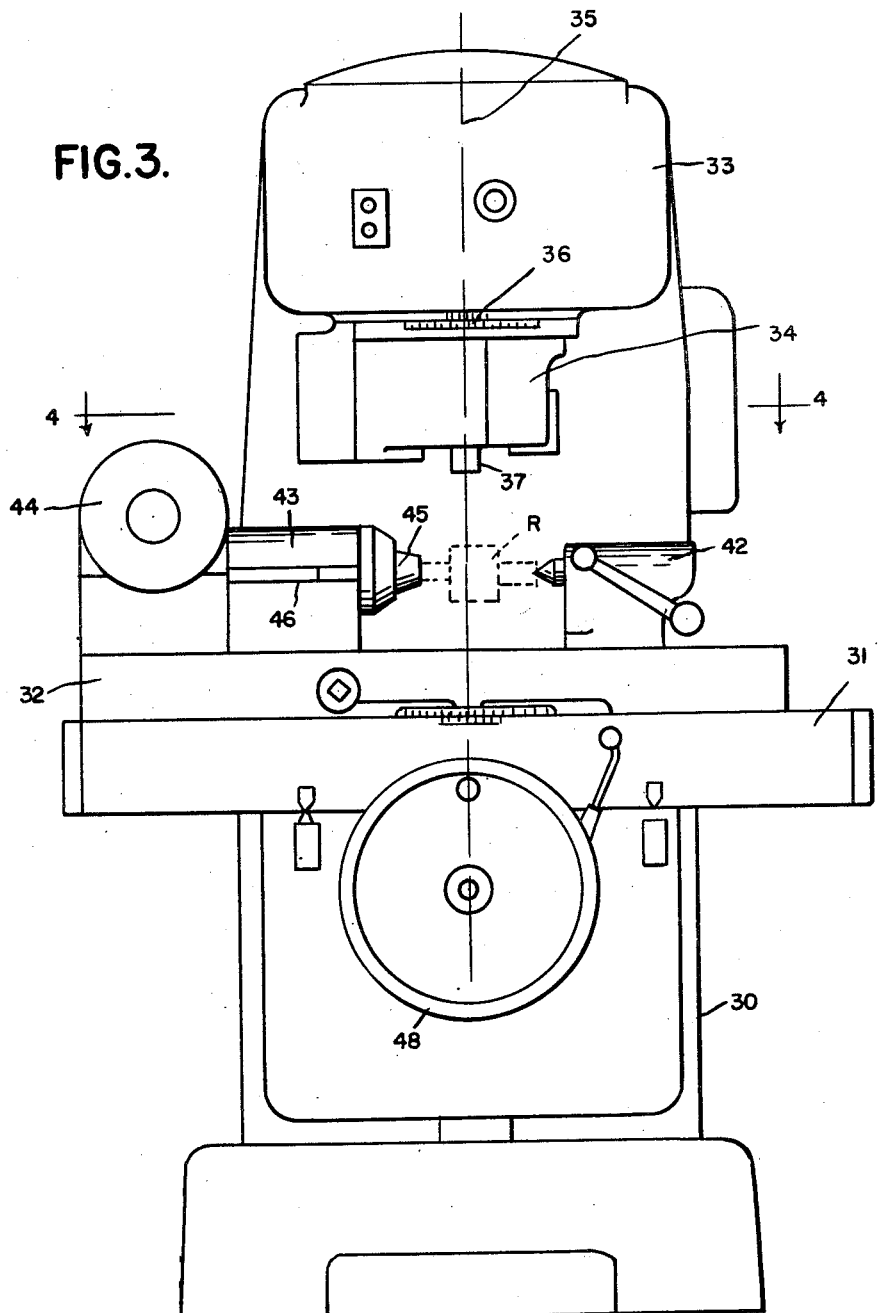
Figure 3 is a front elevation of a machine adapted to carry out the method of the present invention.

Referring now to Figures 3 and 4, there is illustrated apparatus for carrying out the method as thus far described. Referring first to Figure 3, the machine comprises a pedestal 30 having a horizontally extending table 31 on which is mounted a slide 32 which is adapted to be reciprocated to the right and left as seen in Figure 3. Located over the slide 32 is an overhanging head 33 which contains a motor. Adjustably secured to the underside of the head 33 is a cutter support 34 which is adjustable about a vertical axis indicated at 35, suitable graduations as indicated at 36 being provided in cooperating relation on the head 33 and the tool support 34. The tool support 34 carries the cutter 37, and it will be appreciated that by adjustment of the cutter support 34 about the vertical axis 35, the axis of the cutter 37 may be inclined to or crossed with the axis of the work piece as desired. Referring now to Figure 4, the slide 32 is provided with arcuate ways 40 in which is adjustably mounted a work support 41 which is adjustable in the ways 40 about a vertical axis, as for example the axis 35 previously referred to, when the slide 32 is in central position. Means are provided comprising a tailstock 42 and a driven headstock 43 for receiving a rotor R. An electric motor 44 is carried by the work support 41 and is connected by suitable means to the rotatable work holding collet 45. A lever 46 is provided for advancing or retracting the collet to replace the rotors R. It will be observed that the foregoing apparatus is effective to provide relative translation between the work piece and rotor in a direction parallel to the ways provided between the table 31 and the slide 32. Furthermore, the axis of the rotor R may be adjusted with respect to the direction of relative translation by appropriate adjustment of the work support 41. In like manner, the cutter may be adjusted about a vertical axis so that its axis makes the desired angle with the axis of the rotor R and also with the direction of relative traverse between the rotor R and the cutter 37.

The table 31 is mounted for vertical movement in the frame 30, ways 47 being provided therefor, as best seen in Figure 4. A handwheel 48, as seen in Figure 3, is provided for raising and lowering the table 31 so as to bring the work piece into operative relation with the cutter 37. In practice, it is contemplated that the rotor R will be finished to the required dimension in a single pass, that is to say, a reciprocation of the table 31 from one limiting position to the other, and another piece finished on the return pass.

The operation may be carried out in two slightly different methods. The table 31 may be initially set so as to provide the proper center distance between cutter and rotor, and traverse may be continued in either direction into clearance such that a new rotor may be substituted for the finished rotor. The excess traverse is, however, time consuming, and somewhat higher production may be obtained by providing for automatic raising and lowering of the table at the beginning and end of each traverse. Thus each operation, after initial setting, comprises a radial infeed, traverse, and a radial outfeed, all relative between the cutter and rotor.

The crossed axes setting between the work piece R and cutter is maintained between limits of 5° and 30°, and as a general rule the angle of crossed axes is increased where relatively large amounts of stock are to be removed. The angle between the direction of traverse and the tool or work piece axis is determined by the relative width of the surface to be machined and the width of the cutter and is selected such that while the cutter is distributing its finishing action from one end to the other of the surface being machined, the engaged zone on the cutter passes from a point substantially adjacent one edge thereof to the other. As stated above, the use of a relative traverse in a direction which makes an angle with both axes, that is, of the work piece and cutter, is for the purpose of distributing the finishing action over the cutter in order to obtain longer tool life, and where tool life is not an object, the direction of relative traverse may be parallel to the axis of the work piece. It is noted, however, that by employing a relative traverse in a direction which is oblique to both the axis of the work piece and cutter it is possible to obtain finishing action over the complete surface of the rotor with a shorter stroke than is possible when the direction of traverse is parallel to the axis of the rotor.

While the invention has been illustrated in conjunction with an electric rotor of the type employing conventional windings, it is to be understood that it is applicable equally well to any type of electric or magnetic rotor in which the rotor is built up of or contains laminated plates assembled together in abutting relation in which it is desirable either from electrical or magnetic considerations to maintain separation between the edges of the laminations.

While there has been illustrated and described a specific apparatus for carrying out the present method of finishing rotors and the preferred method has been set forth in considerable detail, it will be appreciated that this has been done merely to enable those skilled in the art to practice the invention, the scope of which is indicated by the appended claims.

What I claim as my invention is:

1. The method of machining the peripheral surface of a laminated core electric rotor which comprises engaging the surface of the rotor at one end thereof with a rotary cutter having inclined teeth, rotating the cutter at cutting speeds, relatively traversing the rotor and cutter in a direction oblique to the axes of both rotor and cutter to cause the cutter to cut progressively to the other end of the rotor, and simultaneously rotating the rotor at a speed so related to the speed of rotation of the cutter as to produce a helical scallop on the rotor having an axial pitch of between .1 and .5 inch.

2. The method of machining the peripheral surface of a laminated core electric rotor which comprises engaging the surface of the rotor at one end thereof with a rotary cutter having inclined teeth, rotating the cutter at cutting speeds, relatively traversing the rotor and cutter in a direction oblique to the axes of both rotor and cutter to cause the cutter to cut progressively to the other end of the rotor, and simultaneously rotating the rotor at a speed so related to the speed of rotation of the cutter as to produce a helical scallop on the rotor having an axial pitch of about .25 inch.

DONALD D. AUSTIN, Sr.

REFERENCES CITED

The following references are of record in the file of this patent:

UNITED STATES PATENTS

| Number | Name | Date |
|---|---|---|
| 2,200,544 | Drummond | May 14, 1940 |